United States Patent [19]

Peiffer et al.

[11] Patent Number: 4,575,530
[45] Date of Patent: Mar. 11, 1986

[54] MULTIFUNCTIONAL POLYMERIC ADDITIVE

[75] Inventors: Dennis G. Peiffer, East Brunswick; Robert D. Lundberg, Bridgewater, both of N.J.

[73] Assignee: Exxon Research and Engineering Co., Florham Park, N.J.

[21] Appl. No.: 747,253

[22] Filed: Jun. 21, 1985

Related U.S. Application Data

[63] Continuation-in-part of Ser. No. 720,967, Apr. 8, 1985, which is a continuation of Ser. No. 638,217, Aug. 6, 1984, abandoned.

[51] Int. Cl.$^4$ ............................................. C08L 39/00
[52] U.S. Cl. ................................... 524/548; 524/481; 525/327.1; 526/265; 252/33
[58] Field of Search ............... 524/548, 516, 484, 481; 525/327.1; 526/265; 252/33

[56] References Cited

U.S. PATENT DOCUMENTS

| | | | |
|---|---|---|---|
| 2,484,420 | 12/1946 | Minsk et al. | 525/327.1 |
| 2,540,984 | 10/1948 | Jackson | 526/265 |
| 2,770,603 | 11/1956 | Lynch | 524/548 |
| 2,795,567 | 6/1957 | Ruehrwein | 524/548 |
| 2,828,270 | 3/1958 | Murata | 526/265 |
| 2,899,396 | 8/1959 | Adams et al. | 526/265 |
| 2,927,099 | 3/1960 | Railsback | 525/327.1 |
| 3,423,358 | 1/1969 | Burke, Jr. | 524/548 |
| 3,700,619 | 10/1972 | Burke, Jr. | 524/548 |
| 3,718,631 | 2/1973 | Grosmangin et al. | 526/265 |
| 3,836,511 | 9/1974 | O'Farrell et al. | 525/353 |
| 3,950,294 | 4/1976 | Connelly et al. | 524/577 |
| 4,076,699 | 2/1978 | Grimand et al. | 525/333.5 |
| 4,107,132 | 8/1978 | Burke, Jr. | 524/548 |
| 4,163,740 | 8/1979 | Malassine et al. | 524/548 |
| 4,254,016 | 3/1981 | Onizawa | 524/548 |
| 4,263,419 | 4/1981 | Piestert et al. | 525/309 |

FOREIGN PATENT DOCUMENTS 0103538  3/1984  European Pat. Off. ......... 525/327.1

Primary Examiner—Paul R. Michl
Assistant Examiner—N. Sarafim
Attorney, Agent, or Firm—Richard E. Nanfeldt

[57] ABSTRACT

A water insoluble and oil soluble polymeric additive in combination with a hydrocarbon liquid, said polymeric additive being dissolved in said hydrocarbon liquid at a concentration level of about 0.001 to about 10 wt. %, said polymeric additive comprising a polyampholyte having the formula:

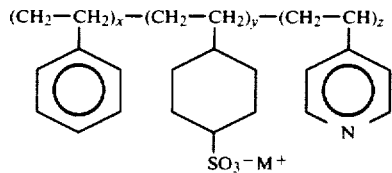

wherein x is about 40 to about 98 mole %, y is about 1 to about 50 mole %, and z is about 1 to about 50 mole %, wherein y and z are less than 60 mole %, and M is an amine or a metal cation selected from the group consisting of aluminum, iron, lead, Groups IA, IIA, IB and IIB of the Periodic Table of Elements.

2 Claims, 1 Drawing Figure

MULTIFUNCTIONAL POLYMERIC ADDITIVE

This application is a continuation-in-part of copending application U.S. Ser. No. 720,967 filed Apr. 8, 1985, which is a continuation application of U.S. Ser. No. 638,217, filed Aug. 6, 1984, now abandoned.

A hydrocarbon-soluble polymeric additive having multifunctional qualities including viscosity-index-improving properties and sludge-dispersing properties is a polyampholyte which is a terpolymer of styrene/-neutralized styrene sulfonate/vinyl pyridine.

BACKGROUND OF THE INVENTION

This invention relates to a multifunctional polymeric additive for hydrocarbon compositions, particularly for lubricating oils. The additive which is a polyampholyte which is a terpolymer of styreneor alkyl styrene/neutralized styrene sulfonate/vinyl pyridine.

The instant exhibits polymers are primarily known for their V.I. (viscosity index) improving properties. Various nonsulfonated polymers have been used as V.I. improvers. Terpolymers of vinyl acetate, an alkyl fumarate and maleic anhydride are taught, for example, in U.S. Pat. No. 3,087,893 and include copolymers made up of from 2 to 15 mole percent of maleic anhydride, 25 to 50 mole percent of an alkyl ester of an alpha, beta-unsaturated dicarboxylic acid, and from 40 to 70 mole percent of an alkylene ester of a $C_1$ to $C_6$ monocarboxylic acid. Techniques for forming the polymers are also well-known. For example, a terpolymer of an alkyl fumarate, vinyl acetate, and maleic anhydride can be prepared by the process disclosed in the aforementioned U.S. Pat. No. 3,087,893 or by the improved process described in U.S. Pat. No. 3,136,743.

U.S. Pat. No. 3,637,610 teaches a V.I. improver which is an oil soluble polymer having free carboxylic acid groups which react with amine-containing polymers.

In recent years, there has been a renewed interest in the physical properties of polymeric complexes (i.e., polyampholytes). These materials have a variety of interesting properties since, for all practical purposes, the cations and anions are chemically attached to the molecular structure of the macromolecules. The counterions of any type are not free to move into the bulk solution as found in classical polyelectrolytes. In addition, it is generally assumed that each individual polymer chain possesses an equal number of cations and anions.

Salamone et al., of the University of Lowell (Massachusetts) are investigating ampholytic polymers as a part of their research program. They have studied the solution properties of divinylic cationic-anionic monomer pairs and also cationic-anionic monomer pairs with a neutral comonomer (*J. Polym. Sci.* AI, 18, 2983 [1980]) which can be incorporated into the ampholytic macromolecular structure through both solution or emulsion polymerization schemes. However, in all of Salamone's work, detailed descriptions of his synthesis is reported. In all instances, the polymerization of the anionic-cationic monomeric species occurred via "ion-pair comonomers that have no nonpolymerizable counterions present" (*J. Polym. Sci.*-Letters, 15, 487 (1977)). Apparently, the physical and chemical properties of these ion-pair comonomers are different than the individual ions (*J. Polym. Sci.*-Letters, 15, 487 (1977)).

Polymeric materials are generally considered useful as viscosification agents when dissolved in an appropriate solvent system. The major reason for this viscosity enhancement is due to the very large dimensions of the individual polymer chain as compared to the dimension of the single solvent molecules. Any increase in the size of the polymer chain will produce a corresponding enhancement in the viscosity of the solution. This effect is maximized when the polymer is dissolved in a "good" solvent. Therefore, in general, a hydrocarbon soluble polymer is useful for thickening hydrocarbon solvents, while a water soluble polymer is appropriate for increasing the viscosity of aqueous systems. With regard to nonaqueous solutions, hydrocarbon based solvent soluble nonionic polymers and low charge density sulfonated ionomers are quite useful in this regard and are commonly used materials. However, the solution properties of the former family of materials are controlled primarily through modification of the molecular weight of the polymer and through changes in the level of dissolved polymer. These materials become especially effective at concentrations where the individual polymer chains begin to overlap. This "transition" is commonly referred to in the literature as the chain overlap concentration or simply C*. It should be noted that in most nonionic polymers of commercial interest, a relatively large amount of polymer is required prior to reaching C*. Therefore, this approach is undesirable from an economic viewpoint. Moreover, the rheological properties of many of these nonionic systems have been published. The results of these studies show that, in general, these solutions are shear thinning over all shear rates investigated.

With regard to lightly sulfonated ionomers, the viscosification efficiency of these materials are primarily controlled through formation of an ionically-linked network structure. As long as this network structure remains intact, the sulfonated ionomers possess outstanding viscosity characteristics such as improved thickening efficiency, especially as compared to its nonionic counterpart, the shear thickening. However, these ionic interactions can be dramatically weakened and even completely eliminated if a polar cosolvent, such as an alcohol or an amine, is dissolved into the solution system. However, it should be noted that a polar cosolvent is required in a number of these materials for solvation to occur. Typically, insolubility in xylene (i.e., inability to form a homogeneous single phase solution) occurs in a low charge density sulfonate ionomer solutions if the sulfonation level is greater than approximately 1.0 mole percent. A direct consequence of the addition of these polar cosolvents is a corresponding reduction in solution properties such as thickening efficiency. For example, shear thickening is completely eliminated or sharply reduced in magnitude at relatively low levels of methanol.

This invention teaches that low charge density sulfonate-containing polyampholytes (example: styrene-styrene sulfonate-4 vinyl-pyridine terpolymers) are readily soluble in a single component nonaqueous solvents such as styrene. A polar cosolvent is not required for solvation to take place. Due to this solubility characteristic, these materials are useful in viscosifying nonaqueous solutions. Interestingly, these polyampholytes can possess the unusual property of constant viscosity, i.e., isoviscosity, as the temperature of the solution is varied. It is believed that this temperature invariance is due to the rather strong interionic and intraionic interactions whose strength remains relatively insensitive to temperature changes in the absence of polar cosolvents. These observations are unexpected, since a polar cosolvent is generally required for effective dissolution of low charge density sulfonate ionomers.

The rapid decrease in viscosity of liquids with increasing temperature is well-known. Ideally, for many applications it would be desirable to solve this problem so that viscosity would be insensitive to temperature. Alternatively, it might be desirable to provide liquid systems whose viscosities actually increase with temperature. It is true that with selected polymeric additives it has been possible to reduce substantially the viscosity change with temperature which does occur with most oils and similar systems. These polymer additives, known as viscosity index improvers (or V.I. Improvers) are generally high molecular weight polymers.

The way in which these additives function can be summarized very briefly. In effect, they perform two functions, i.e., thickening, which merely increases fluid viscosity; and Viscosity Index (V.I.) improvement, which corresponds to limited thickening at ambient temperatures and a correspondingly greater thickening at elevated temperatures. This can be accomplished by utilizing a polymeric additive which is poorly solvated by the liquid at ambient temperatures; however, at elevated temperatures the polymer is more highly solvated such that the polymer expands and is a relatively more effective thickener.

While these V.I. Improvers have proven successful commercially, it is important to note that their effect at reducing viscosity changes with temperatures is rather mild. For a typical base oil containing a suitable V.I. Improver, the kinematic viscosity will still decrease by a factor of from 5 to 10 as the temperature increases from 30° to 100° C. Obviously, if it is desired to hold the viscosity roughly constant with such temperature changes, current technology has not offered an appropriate additive system.

U.S. Pat. No. 3,396,136 describes how copolymers of alkenyl aromatic sulfonic acids, when properly neutralized, can be employed as thickeners for nonpolar solvents. Those metal sulfonate systems have been shown to be very effective; however, when employed as two component systems (i.e., ionic polymer plus nonpolar solvent), the variation of viscosity with increased temperature is very conventional and predictable. That is, the solution viscosity decreases markedly as temperature is increased.

U.S. Pat. No. 3,396,136 further teaches "in situ" neutralization of the sulfonic acid polymer which, under some conditions, can result in the availability of a small amount of polar cosolvent—i.e., a solvent for the sulfonate groups about equal in amount to the amount of sulfonate groups which are present. This amount of polar cosolvent is not within the limits of the instant invention, which only optionally requires amounts of the third component (which interacts with the ionomeric groups of the ionomer copolymer) at levels which range from 10 to 600 times the molar equivalence of ionic groups. This level of cosolvent is about one to two orders of magnitude or more higher than employed in the cited art. In addition, the cited patent is restricted to aromatic sulfonate polymers. The instant invention describes other polymers such as sulfonated ethylene propylene terpolymers, sulfonated Butyl, etc., which are a portion of the polymer complex.

U.S. Pat. No. 3,366,430 teaches the gelling of organic liquids by the interaction of polar "associative bonds" which includes hydrogen bonding and "ionic crosslinking". Again, this patent specifies that two components are necessary—the associating polymer (or polymers in some cases) and the nonpolar organic liquid. There is no mention of a third polar cosolvent except to point out that such polar liquids should not be present. Specifically, this patent states (Column 2, line 7) that the hydrocarbon liquids to which this invention is to be applied should not contain a substantial portion of a miscible protolytic liquid such as methanol. It is clear that the language of this patent limits this invention to gels and further, that any amount of polar liquids which are present to an extent where they disrupt those gels are undesirable. The instant invention is distinct from that cited in that amounts of such polar compounds, as will break up gel at ambient conditions, are required and in fact the most preferred state is free of any said gel at ambient temperatures.

U.S. Pat. No. 3,679,382 teaches the thickening of aliphatic hydrocarbons with synthetic organic polymers which contain olefinically unsaturated copolymerizable acids, amides, hydroxyacrylic esters, sulfonic acids, etc. It is emphasized in this patent (Column 3, line 72) that it is critical that in the preparation of such polymers no surface active agent, catalyst or other additive be employed which introduces a metallic ion into the system. Therefore, it is preferred to employ ammonium or amine salts. It is clear that this invention (U.S. Pat. No. 3,679,382) specifically precludes the use of metallic counterions—and is directed towards amine or ammonium derivatives. Finally, this cited patent does describe (Column 7, lines 13-19) that the addition of alcohols will reduce the viscosity of the thickened hydrocarbon and alter flow characteristics thereof.

U.S. Pat. Nos. 3,931,021 and 4,118,361 describe the use of ionic polymers and required cosolvents in an organic liquid and V.I. Improvers. The instant invention represents an improvement over U.S. Pat. Nos. 3,931,021 and 4,118,361. Since cosolvents are not required for the instant invention for many of the polymer compositions, there is more latitude in employing these compositions in controlling viscosity of organic liquids.

U.S. Pat. No. 547,908, now abandoned, teaches a method of controlling the viscosity of the organic liquids with polymeric complexes of a vinyl pyridine copolymer and a sulfonated polymer.

SUMMARY OF THE INVENTION

The present invention relates to hydrocarbon solution additives which are polyampholytes and have multifunctional properties including viscosity index improver and sludge dispersing properties, wherein the instant polyampholytes are also viscosity control agents for nonpolar hydrocarbon liquids, such as jet fuel, wherein the hydrocarbon solutions have dilatant properties in which the hydrocarbon solution contains a polyampholyte which incorporates cationic and anionic moieties on the same polymeric backbone.

GENERAL DESCRIPTION OF THE INVENTION

The present invention relates to hydrocarbon solution additives which are polyampholytes and have multifunctional properties including viscosity index improver and sludge dispersing properties, wherein the instant polyampholytes are also viscosity control agents for nonpolar hydrocarbon liquids, such as jet fuel, wherein the solutions have dilatant properties in which the hydrocarbon solution contains a polyampholyte which incorporates cationic and anionic moieties on the same polymeric backbone.

The polyampholytes of the instant invention are terpolymers of a nonionic monomer, a sulfonate-containing monomer and an amine-containing monomer. The terpolymers of the instant invention are formed by a free radical polymerization of the amine-containing monomer and the nonionic monomer to form a copolymer of the nonionic monomer and the amine-containing monomer. This copolymer is subsequently sulfonated according to the procedures of U.S. Pat. No. 3,642,728, which is hereby incorporated by reference, to form the terpolymer of the nonionic monomer, the sulfonate-containing monomer and the amine-containing monomer.

A suitable hydrocarbon solution, water insoluble terpolymer of the instant invention is styrene/metal styrene sulfonate/vinyl pyridine which has the formula:

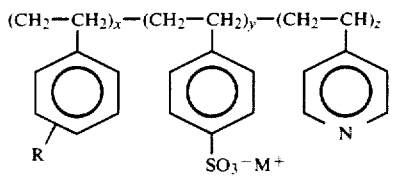

wherein x is about 40 to about 98 mole %, more preferably about 50 to about 95 mole %, and most preferably about 80 to about 90, y is about 1 to about 50 mole %, more preferably about 2 to about 20 mole %, and most preferably about 2 to about 10 mole %, and z is about 1 to about 50 mole %, more preferably about 2 to about 20, and most preferably about 2 to about 10, wherein y and z are less than 60 mole %, and M is an amine or a metal cation selected from the group consisting of aluminum, iron, lead, Groups IA, IIA, IB and IIB of the Periodic Table of Elements and where R is hydrogen or an alkyl group of from 1 to 12 carbon atoms.

The molecular weight, as derived from intrinsic viscosities, for the terpolymers of styrene/metal styrene sulfonate/vinyl pyridine is about $1 \times 10^3$ to about $5 \times 10^7$, more preferably about $1 \times 10^4$ to about $2 \times 10^7$ and most preferably about $1 \times 10^5$ to about $1 \times 10^7$. The means for determining the molecular weights of the oil soluble, a water insoluble terpolymers from the viscosity of solutions of the terpolymers comprises the initial isolation of the hydrocarbon soluble terpolymers, purification and redissolving the terpolymers in a nonaqueous solvent to give solutions with known concentrations. The flow times of the solutions and the pure solvent were measured in a standard Ubbelholde viscometer. Subsequently, the reduced viscosity is calculated through standard methods utilizing these values. Extrapolation to zero polymer concentration leads to the intrinsic viscosity of the polymer solution. The intrinsic viscosity is directly related to the molecular weight through the well-known Mark Houwink relationship.

The styrene/vinyl pyridine copolymers or alkyl styrene/styrene vinyl pyridine copolymers are formed by free radical copolymerization using techniques well-known in the polymer literature. Such polymers can be prepared by a variety of techniques by reacting the amine-containing monomer (vinyl pyridine) with monomers collected from the group consisting of styrene, t-butyl styrene, alkyl acrylates, alkyl methacrylates, butadiene, isoprene vinyl chloride, acrylonitrile, acrylonitrile/butadiene/styrene monomer mixtures and copolymers, or more complex mixtures. An emulsion polymerization process is generally preferred, but other processes are also acceptable.

The vinyl pyridine content of the preferred copolymer of styrene and vinyl pyridine is about 1 to about 50 mole percent, more preferably about 2 to about 20 mole percent and most preferably about 2 to about 10 mole percent. The number of average molecular weight measured by GPC is about 10,000 to about 10,000,000 preferably about 20,000 to about 5,000,000 and most preferably about 30,000 to about 2,000,000.

The amine-containing copolymer is typically a polymeric backbone where the nitrogen elements are in the chain or pendant to it. Such a polymer may be obtained by direct copolymerization of a monomer containing the basic moiety with other monomers, or by grating a monomer containing the basic moiety on to a polymerized chain. Monomers can be chosen from vinyl monomers leading to hydrocarbon soluble polymers such as styrene, t-butyl sytrene, acrylonitrile, isoprene, butadiene, acrylates, methacrylates and vinyl acetate. Monomers containing a basic moiety will be those who contain amine or alkyl amine groups or pyridine groups, such as vinyl pyridine.

The amount of vinyl pyridine in the amine-containing copolymer can vary widely, but should range from less than 0.01 weight percent down to at least 10 weight percent.

Preferably, the amine content in the amine-containing copolymer is expressed in terms of basic nitrogen. In this respect, the nitrogen content in amides and similar nonbasic nitrogen functionality is not part of the interacting species.

A minimum of three basic groups must be present on the average per polymer molecule and the basic nitrogen content generally will range from 4 meq. per 100 grams of polymer up to 500 meq. per 100 g. A range of 8 to 200 meq. per 100 g. is preferred.

The amine-containing copolymer of styrene and vinyl pyridine is sulfonated according to the procedure of U.S. Pat. No. 3,642,728 which is herein incorporated by reference to form the terpolymer of styrene/styrene sulfonic acid/vinyl pyridine which is subsequently neutralized with an amine or metal cation to form the terpolymer of styrene/neutralized styrene sulfonate/vinyl pyridine.

The number of sulfonate groups contained in the terpolymer is a critical parameter affecting this invention. The number of sulfonate groups present in the polymer can be described in a variety of ways such as weight percent, mole percent, number per polymer chain, etc. For most polymer systems of interest in this invention, it is desirable to employ mole percent. An alternate way of expressing this is to state the sulfonate level in terms of milliequivalents (meq.) of sulfonic acid groups per 100 gms of polymer. This latter procedure provides a rapid and independent measure of sulfonic acid content in a polymer through simple titration.

Both mole percent sulfonate and milliequivalent of sulfonate will be employed to describe the sulfonate polymers employed in this invention.

In general, the terpolymer will comprise from about 1 meq. up to 500 meq. of sulfonate groups per 100 g. of polymer, more preferably about 10 meq. to about 100 meq. of sulfonate groups per 100 grams of polymer. The unneutralized sulfonate terpolymers in the instant invention are neutralized with the basic materials selected from the group consisting of Groups IA, IIA, IB and IIB of the Periodic Table of the Elements and lead, tin and antimony. A preferred counterion for this invention is zinc, as hereafter explained.

Neutralization of the unneutralized sulfonated terpolymers with appropriate metal hydroxides, metal acetates, metal oxides, etc. can be conducted by means well-known in the art. For example, the sulfonation process of the copolymer containing a small 0.3 to 1.0 mole % unsaturation, can be conducted in a suitable solvent such as 1,2-dichloroethane with acetyl sulfate as the sulfonating agent. The resulting sulfonic acid derivative can then be neutralized with a number of different neutralization agents such as sodium phenolate and similar metal salts. The amounts of such neutralization agents employed will normally be stoichiometrically equal or in some excess to the amount of free acid in the polymer plus any unreacted reagent which still is present. It is preferred that the amount of sulfonating agent originally employed plus 10% more to ensure full neutralization. The use of more of such neutralization agent is not critical. Sufficient neutralization agent is necessary to affect at least 50% neutralization of the sulfonic acid groups present in the polymer, preferably at least 90%, and most preferably essentially complete neutralization of such acid groups should be affected.

The degree of neutralization of said sulfonate groups may vary from 50 to 500 mole %, preferably 90 to 200%. It is preferred that the degree of neutralization be substantially complete, that is, with no substantial free acid present and without substantial excess of the base other than that needed to ensure neutralization. Thus, it is clear that the polymers which are utilized in the instant invention comprise substantially neutralized pendant groups and, in fact, an excess of the neutralizing material may be utilized without defeating the objects of the instant invention.

We have surprisingly found that a very important factor in determining the strength of the interaction between the sulfonate groups, amine-containing groups in the terpolymer is the nature of the counterion. There are, broadly speaking, three major classes of such counterions. The first class, which are less preferred, are those metals of Group I and Group IIA, which include Li, Na, K, etc., Be, Mg, Ca, etc. We have found that these species do not interact as strongly with amine groups as the more preferred species described below. Those metals are commonly defined as members of the transition elements (see chemical text: "Chemical Principles and Properties", by M. J. Sienko and R. A. Plane, McGraw Hill Book Co., 1974, page 19). These metal cations are best exemplified by zinc and interact strongly with pyridine and similar amines. As a consequence, a zinc neutralized sulfonate groups interacts much more strongly with the vinyl pyridine in the terpolymer than does a magnesium or sodium neutralized system. It is for this reason that the transition elements are preferred with zinc, copper, iron, nickel and cobalt being especially preferred. We also include antimony and lead as suitable cations.

A third species which is preferred is the free sulfonic acid of the terpolymer, which will also interact with the vinyl pyridine. In this latter case, it is clear that the interaction is a classic acid-base interaction, while with the transition metals, a true coordination complex is created, which is due to the donation of the electron pair of the nitrogen element. This distinction is a very important one and sets these polyampholytes apart from classic acid-base interactions. The surprising observation is that such coordination complexes can form in such extreme dilution insofar as interacting groups are concerned, and that they are apparently formed so far removed from their expected stoichiometry, (based on small molecule analogs). Therefore, only those polymer backbones (i.e., as measured in the absence of ionic groups) having a solubility parameter less than 10.5 are suitable in this invention.

The concentration of the polyampholytes in the hydrocarbon liquid is about 0.001 to about 10 weight %, wherein the oil composition range from gasoline fractions through middle distillate fuels. The additives of this invention can also be employed, either alone or in combination with other hydrocarbon-soluble additives, in jet fuels and gasolines in concentrations ranging from about 0.001 to 1.0 wt. percent as detergent and/or rust preventive additives.

In controlling the viscosity of non-polar hydrocarbon liquids, the polyampholyte is added to the non-polar hydrocarbon liquid at a concentration of about 0.001 to about 20 wt. %, more preferably about 0.01 to about 10, and most preferably about 0.1 to about 5.

The hydrocarbon organic liquid which has a solubility parameter of less than 9.5 and is selected from the group consisting of mineral oil, synthetic oil, alkanes, cycloalkanes and aromatics and mixtures thereof.

DESCRIPTION OF THE PREFERRED EMBODIMENTS

Figure 1:
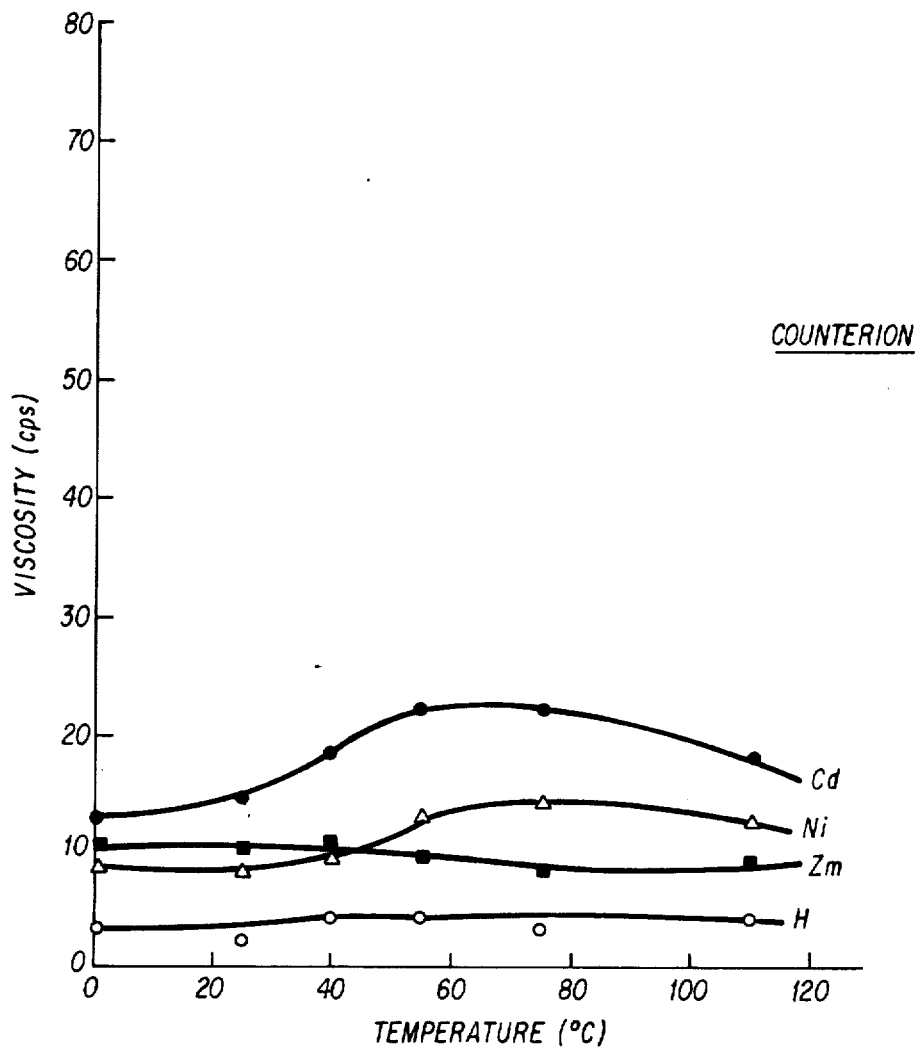

The following examples illustrate the present invention, without; however, limiting the same hereto.

EXAMPLE 1

A representative example for the synthesis of the styrene-4 vinyl pyridine copolymer which is subsequently sulfonated is described below.

Into a 1 liter, 4 neck flask, add:
50 g styrene
3.2 g sodium lauryl sulfate
120 ml distilled water
0.2 g potassium persulfate
0.05 g dodecylthiol
1.1 g 4-vinyl pyridine The solution was purged with nitrogen gas for one hour to remove dissolved oxygen. As the nitrogen gas purging began, the solution was heated to 50° C. After 24 hours, the polymer was precipitated from solution with a large excess of acetone. Subsequently, the polymer was washed with acetone and dried in a vacuum oven at 60° C. for 24 hours. Elemental analysis showed that the copolymer contained 2.5 mole % 4-vinyl pyridine.

EXAMPLE 2

A representative example for the sulfonation of the styrene-4 vinyl pyridine copolymer is described below. It is noted that this sulfonation route is described in U.S. Pat. No. 3,870,841 (1975 to Exxon Research and Engineering Company).

The following procedure was generally followed: 50 g the copolymer was dissolved in 500 ml of 1,2-dichloroethane. The solution was heated to 50° C., and the requisite amount of acetyl sulfate was added, in this case, 34.6 ml of 0.996M acetyl sulfate (24.5 meq.). The solution was stirred for 60 minutes at 50° C., and the reaction was terminated by the addition of 40 ml of methanol. Sufficient zinc acetate (diluted with methanol) was added to neutralize all acid present. The polymer solution was precipitated into a substantial excess of methanol with vigorous agitation, followed by filtration and washing with methanol. The product was then vacuum dried. Analyses were conducted for sulfur and sodium. The level of sulfonate incorporated was determined by sulfur analysis.

Elemental analysis shows that 1.6 mole % sulfonate groups was incorporated into the polymer chain structure.

EXAMPLE 3

Table 1 shows the solubility characteristics of a sulfonated polystyrene-zinc salt (Zn-SPS) and a sulfonate-containing polyampholyte (Zn-polyampholyte) at essentially equivalent charge densities.

TABLE 1

| Comparison of the Solubility of Zn-SPS With the Corresponding Zn-Polyampholyte | | | |
|---|---|---|---|
| Polymer | Sulfonation Level (Mole %) | Base Level (Mole %) | Solubility |
| Zn-SPS | 2.6 | 0.0 | Insoluble |
| Zn-Polyampholyte | 2.4 | 4.8 | Soluble |

These results confirm that the solubility of a sulfonate-containing ionomer is markedly improved with the corporation of base-containing monomer units, such as 4-vinyl pyridine, within the polymer chain structure.

EXAMPLE 4

FIG. 1 shows the effect of temperature on viscosity of a number of polyampholytes neutralized with a variety of counterions, i.e., nickel (Ni), cadmium (Cd), zinc (Zn), and the free acid (H). In all instances, the viscosity values remain invarient with a temperature increase. This is a new and unexpected result. Even though the underlying mechanism has not been completely detailed as of the present time, this phenomena has a wide variety of technological applications. Again, it is noted a single component nonaqueous solvent (xylene) is used for dissolving these materials.

What is claimed is:

1. A terpolymer having the formula:

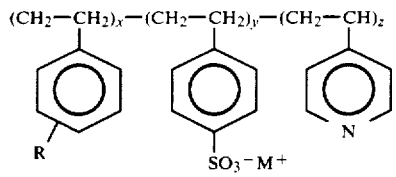

wherein x is about 40 to about 98 mole %, y is about 1 to about 50 mole %, and z is about 1 to about 50 mole %, wherein y and z are less than 60 mole %, and M is an amine or a metal cation selected from the group consisting of aluminum, iron, lead, Groups IA, IIA, IB and IIB of the Periodic Table of Elements and where R is hydrogen or an alkyl group of from 1 to 12 carbon atoms.

2. A polymeric solution comprising:
(a) a non-polar hydrocarbon liquid; and
(b) about 0.001 to about 20 wt.% of a polyampholyte having the formula:

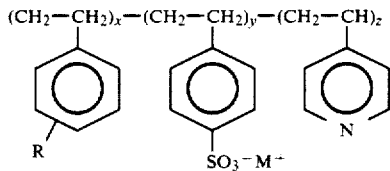

wherein x is about 40 to about 98 mole %, y is about 1 to about 50 mole %, and z is about 1 to about 50 mole %, wherein y and z are less than 60 mole %, and M is an amine or a metal cation selected from the group consisting of aluminum, iron, lead, Groups IA, IIA, IB and IIB of the Periodic Table of Elements and R is hydrogen or an alkyl group of 1 to 12 carbon atoms;
(c) and optionally containing a polar cosolvent having a solubility parameter of at least 9.0, and present at a level of 0.5 up to 15 weight percent in the final solution.

* * * * *

UNITED STATES PATENT AND TRADEMARK OFFICE
CERTIFICATE OF CORRECTION

PATENT NO. : 4,575,530

DATED : March 11, 1986

INVENTOR(S) : Dennis G. Peiffer, et al.

It is certified that error appears in the above-identified patent and that said Letters Patent is hereby corrected as shown below:

It is certified that error appears in the above-identified patent and that said Letters Patent are hereby corrected as shown below:

In the Abstract the formula should read:

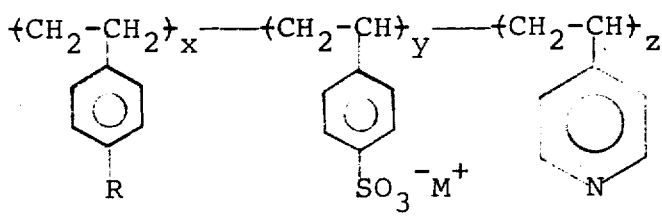

Signed and Sealed this

Twenty-second Day of July 1986

[SEAL]

Attest:

DONALD J. QUIGG

Attesting Officer

Commissioner of Patents and Trademarks